United States Patent [19]

Tice et al.

[11] 4,006,554

[45] Feb. 8, 1977

[54] FISHHOOK REMOVER AND LEADER STORAGE DEVICE

[76] Inventors: Richard P. Tice, 3211 N. Nelson, Spokane, Wash. 99206; Donald L. Galbraith, 6205 N. Nevada, Spokane, Wash. 99207

[22] Filed: July 17, 1975

[21] Appl. No.: 596,714

[52] U.S. Cl. ............................................. 43/57.5 R
[51] Int. Cl.² ........................................ A01K 97/06
[58] Field of Search ....... 43/57.5 R, 57.5 A, 54.5 R

[56] References Cited

UNITED STATES PATENTS

| | | | |
|---|---|---|---|
| 2,594,472 | 4/1952 | McClain | 43/57.5 R |
| 2,936,963 | 5/1960 | Witte | 43/57.5 R X |
| 3,133,683 | 5/1964 | Deacon, Sr. | 43/54.5 R X |

FOREIGN PATENTS OR APPLICATIONS 494,344  7/1953  Canada ............................ 43/57.5 R

*Primary Examiner*—Russell R. Kinsey
*Assistant Examiner*—Daniel J. Leach
*Attorney, Agent, or Firm*—Wells, St. John & Roberts

[57] ABSTRACT

A reusable storage device for a fishhook and attached leader includes an elongated body formed of a semi-rigid material with longitudinally spaced oppositely facing grooves at opposed ends thereof. A hole is formed through the body to receive a hook shank. The hook may be placed through the hole and thereby engaged with the device while the attached leader is wrapped about the body utilizing the opposed grooves for storage purposes. A curved slit is provided through the body extending from one longitudinal edge toward an opposed edge for receiving and securely holding the leader end. One groove may be utilized along with the remainder of the body as a device for assisting in removing a hook from the mouth or throat of a fish.

2 Claims, 3 Drawing Figures

FISHHOOK REMOVER AND LEADER STORAGE DEVICE

BACKGROUND OF THE INVENTION

The present invention relates to fishhook and leader storage devices and more particularly such devices that may also be utilized to remove a hook from the mouth or throat of a fish.

Ordinarily, fishhooks that are sold with attached leaders are provided on a paper card wherein a plurality of hooks are connected to integral loops formed therein, with the leaders extending around the card to an appropriately spaced similar loop. Usually, such cards are formed of paper and, in order for the hook and leader to be removed, the paper loops are often torn or broken, thus rendering the card useless as a future storage device for the individual hooks and leaders.

Another commonly utilized container for combination hook and leaders is simply a plastic bag in which the leader is coiled with the leader end wrapped about the coil. It is often difficult to unwind such a coil of leader without tangling the leader in the coil.

Permanent hook and leader storage devices have been known wherein a plurality of hook and leader assemblies are stored by a single card shaped storing device. Although serviceable, these devices are somewhat bulky and do not prevent tangling of the separate leaders thereon.

Further difficulty in sport fishing is seen in removing hooks that have become lodged in the mouth or throat of a fish. It is desirable to carefully remove the hook when a small or other unwanted fish is caught, in order to minimize injury to the fish. This is difficult to accomplish when the hook is swallowed or otherwise embedded in the fish's mouth where removal by hand is difficult or endangers the life of the fish.

Various apparatuses have been utilized to assist fisherman in safely and effectively removing a hook from the mouth or throat of a fish without fatally injuring the fish. Such apparatuses take the form of long bodied pliers or a slotted bulb at the end of an elongated shank. With the bulb type, the fish leader must be held taut while the bulb is worked along the leader to the embedded hook. When the bulb is in place adjacent to the hook, the fish must be held securely and the leader held taut while the bulb is operated against the embedded hook. This is a very difficult task since all three functions must be accomplished simultaneously. It is therefore desirable to obtain a hook removal device that will allow the fisherman to hold the fish in one hand while removing the hook with the other hand.

It is therefore a primary object of the present invention to provide a device that may be utilized both for storing leader and hook assemblies and for assisting in the removal of hooks from a fish's mouth or throat to minimize the chance of injury to the fish.

It is another object to provide such a device that will accomplish the function of holding the fish leader taut between the device and fishhook during the hook removal process so as to enable the fisherman to operate the device with one hand while holding the fish with the other hand.

It is another object of the present invention to provide a device for storing leader and hook assemblies wherein a hook or hooks and a single attached leader may be stored conveniently in a rather compact condition without danger of tangling whether in a tackle box or on the fishing pole.

It is a further object to provide such a device that is very simple in construction, may be made from relatively inexpensive material, and will therefore be inexpensive to purchase.

It is a still further object to provide such a device that enables tieing of the leader end to a fish line prior to removing the entire leader and hook assembly from the storage device.

These and still further objects and advantages will become apparent upon reading the following detailed description which, taken with the accompanying drawing, disclose a preferred form of the present invention. It should be noted however that the preferred form as described and illustrated is given only by way of example, the scope of our invention being set out solely by the accompanying claims.

BRIEF DESCRIPTION OF THE DRAWINGS

A preferred form of the present invention is illustrated in the accompanying drawings in which.

DETAILED DESCRIPTION OF A PREFERRED EMBODIMENT

Figure 1:
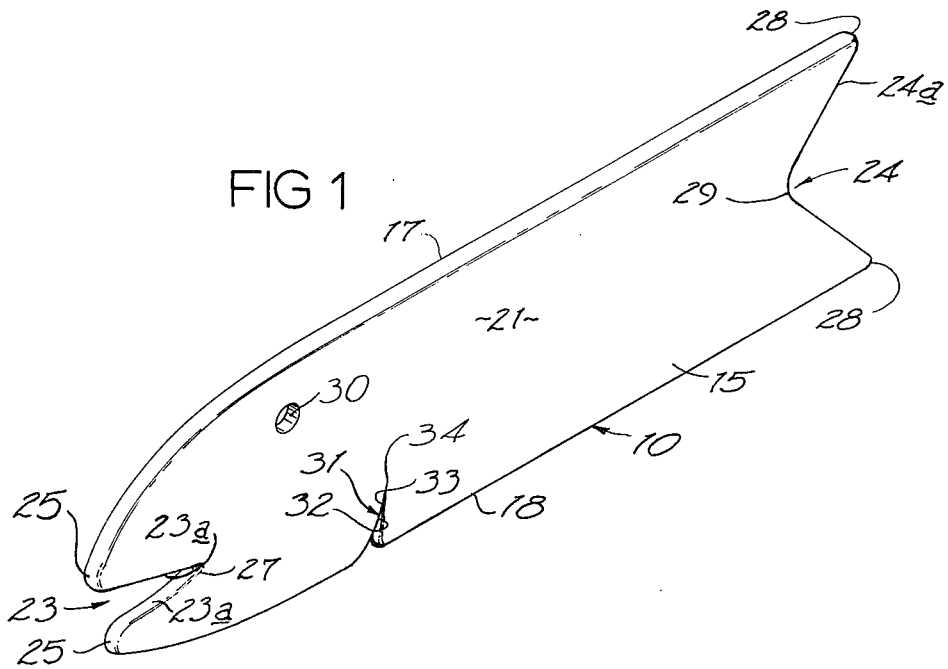
FIG. 1 is a pictorial view of the device.
Figure 2:
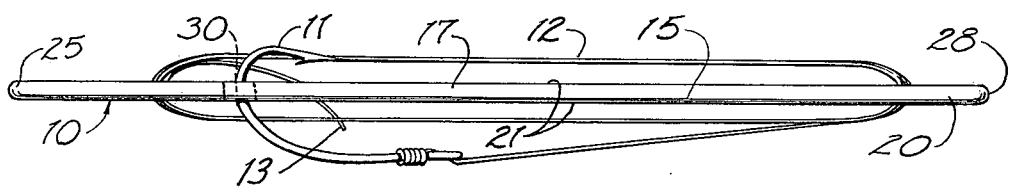
FIG. 2 is a side elevational view of the device having a hook and leader combination stored thereon.
Figure 3:
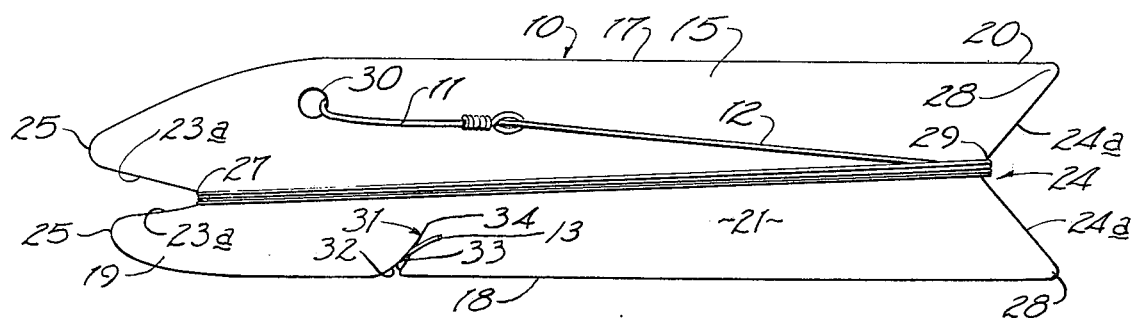
FIG. 3 is a plan view as seen from above in FIG. 2 showing the device utilized to store a hook and leader combination.

Referring in greater detail to the drawings, the present device may be seen in FIGS. 1 through 3 and is designated therein by the reference character 10. FIGS. 2 and 3 show the device 10 storing a hook 11 and attached leader 12. The hook 11 and leader end 13 are secured to the device. The intermediate length of the leader 12 between end 13 and hook 11 is wrapped about the device and held securely thereby. The device 10 is capable of storing a leader 12 that may have weights affixed thereon.

The device 10 is comprised of a semi-rigid body 15 preferably of a synthetic resin material such as polypropylene of a thickness of 0.060 inches. The body 15 is comprised of a longitudinal top edge 17 and a transversely spaced longitudinal bottom edge 18. Edges 17 and 18 are substantially parallel to one another. Body 15 further includes a front end 19 and a back end 20. The edges 17, 18 and ends 19 and 20 are joined by a parallel spaced pair of planar side surfaces 21.

The front end 19 is tapered inward from the edges 17 and 18 includes a first groove 23 with edges 23a that converge toward the back end 20. Likewise, the back end 20 includes a second groove 24 with edges 24a that converge toward the first groove 23. However, the forward end 19 includes curved shoulders 25 that connect tangentially to the top and bottom edges 17 and 18 and to the groove edges 23a. Second groove edges 24a converge forwardly from end points 28 on the top and bottom edges 17 and 18. The first and second groove edges 23a and 24a converge to base apexes 27 and 29. The base apexes 27 and 29 have substantial radii to prevent crimping of the leader.

A hole 30 is formed through the body 15 between side surfaces 21. The hole 30 is offset toward top edge 17 from a line defined between base apexes 27 and 29.

A curved slit 31 is also formed within body 15. Slit 31 is defined by adjacent forward and rearward curved converging edges 32 and 33 that extend transversely into the body section 15 toward the top edge 17. The slit 31 extends inward into the body section 15 toward the top edge 17. The slit 31 extends inward from the bottom edge 18 and rearward toward the opposite edge 17. The thickness of the slit at edge 18 is greater than the diameter of the fishing leader. The thickness of the slit then progressively diminishes from the edge 18 to a terminating point 34 in which the thickness of the slit 31 adjacent the terminating point 34 is less than the diameter of the fishing leader so that the leader is firmly held in the slot by frictional contact with the edges 32 and 33.

The arrangement of the characteristics of the device 10 as described thus far lend an outward appearance to the device similar to that of a fish wherein the first groove 23 resembles the mouth, the hole 29 represents an eye, the slit 31 resembles a gill, and the second groove 24 represents the tail.

Although the device as shown and described visually resembles a fish, the elements as described each are functional for storing hook and/or leader.

In operation as a storage device a fishhook 11 may be inserted with its shank projecting through the hole 30. The attached leader 12 is then wrapped about the body 15 utilizing the grooves 23 and 24 to receive and store the loops of leader. The leader end 13, once the entire leader length has been wrapped about the body 15, may be engaged securely within the slit 31 with adjacent slit edges 32 and 33 tightly clamping the leader end or a portion of the leader adjacent the end 13. The curved nature of the slit 31 facilitates placement of the leader end within slit 31. The device, along with the attached hook and leader may then be stored indefinitely. The length of body 15 enables other material such as sinkers, spinners, lures, etc. to be stored along with associated hooks and leader on the device.

To remove the leader 12 and attached hook 11 from the device, the leader end is grasped and removed from slit 31. The length of leader 12 may then be unwrapped from the body 15.

It may be helpful to the fisherman to unwind the leader 12 until a sufficient length is free to enable tieing or joining of the leader to a fishline. Once a sufficient length has been disengaged from the body 15, the leader may be again secured to body 15 by reinserting the leader into slit 13. The remainder of the leader length and hook will therefore remain engaged with the body 15, preventing their tangling while the leader end and fishline are being joined. Once this has been accomplished, the leader may be again disengaged from slit 31 and the remainder of leader 12 may be unwrapped from body 15. Finally, hook 11 can be disengaged from hole 30 to completely free the hook and leader from the device 10.

The tapered front end 19 and the rounded shoulder 25 and lateral space between the longitudinal edges 17 and 18 enable insertion of the body 15 into a fish's mouth or throat in order to remove a hook embedded therein. Rounded shoulders 25 converge forwardly before they tangentially join the groove edges 23a. This shape enables insertion of the device into a fish's mouth without damaging the surrounding tissues. Further, the lateral spacing between the edges 17 and 18 is somewhat smaller than the opening of the fish's mouth. Of course, the device is intended to be manufactured in different sizes to enable its utilization not only with different size fishhooks and leaders but to facilitate removal of hooks from different size fish. For example, if the device is utilized for ordinary trout or other rather small size fresh water fish, i.e. 6 to 18 inches, the space between edges 17 and 18 is set to be approximately ¾ of an inch. The length of the device between ends 19 and 20 may also vary with the length of leader utilized and, again, the size range of fish that the device is desired to be utilized with.

In operation as a hook removing device, the body 15 is utilized as a guide with the first groove 23 engaging the hook shank between the eye and barb thereon. To utilize the device as such, the fisherman first holds the device in one hand with the end 19 pointing toward the fish's mouth. He then wraps the leader once about the body 15 from groove 24 to groove 23 and back approximately midway along the length of body 15. He then slides body 15 along the loop of leader and into the fish's mouth, until the hook is engaged and held between the converging groove edges 23a. In this condition, the hook would appear somewhat as it does in FIG. 2 only with the hook shank in position between the converging edges 23a, and with only one loop of leader extending about the body 15. The fisherman may then hold the device in one hand while applying pressure to the leader wrapped about the body 15 with a finger of the same hand while holding the fish with the remaining hand. He may then push the hook shank or twist the hook against either side of groove 23 to facilitate its removal from the fish's mouth or throat. The hook is engaged by the device 10 along the shank adjacent to the barbed end. This facilitates ease in removal of the barb since direct pressure may be applied along the line of insertion that the barb followed when it became engaged or embedded within the fish. In moving the barbed end in a reverse direction as such, little more damage or injury is caused since the hook is removed from its point of entry. Therefore, injury to the fish is held at a minimum.

It should again be noted that the above description and attached drawings are given merely by way of example and that the scope of my invention is defined only by the following claims.

What I claim is:

1. A fishhook remover and hook and leader storage device, comprising:
   an elongated body having top and bottom longitudinal edges extending between front and back ends and with planar parallel side surfaces joining said top and bottom edges and front and back ends;
   a front leader receiving groove formed integrally within the body at the front end thereof extending toward the back end;
   wherein the lateral distance between said top and bottom edges is sufficient to enable insertion of said body into the mouth of a fish;
   wherein the front leader receiving groove is sufficiently open to enable the groove to receive a fishhook when the body is inserted into the mouth of the fish to assist in a fishhook removal operation;
   a back leader receiving groove formed integrally within the body at the back end thereof and extending toward the front end;
   a leader end receiving slit extending into the body from the bottom longitudinal edge toward the top edge;
   wherein said slit extends in a curve inward and rearward from the bottom longitudinal edge with a diminishing thickness between slit edges to securely grip a leader end therein; and
an open hook shank receiving hole formed through the body between the side surfaces adjacent the top edge.

2. The device as set out by claim 1 wherein said front and back leader receiving grooves are formed by edges converging longitudinally to apexes and wherein said hole is offset toward said top longitudinal edge from a line defined between said apexes.

* * * * *